United States Patent [19]
Cheng

[11] Patent Number: 6,117,201
[45] Date of Patent: Sep. 12, 2000

[54] EASILY STORABLE DUST COLLECTING CONTAINER

[76] Inventor: Meng-Chieh Cheng, No. 169, Chung-Shan Rd., Feng-Yuang City, Taiwan

[21] Appl. No.: 09/289,072

[22] Filed: Apr. 8, 1999

[51] Int. Cl.$^7$ ................................................ B01D 45/16
[52] U.S. Cl. ........................ 55/356; 55/342; 55/359; 55/429; 55/449; 55/451; 55/473
[58] Field of Search ........................ 55/342, 349, 356, 55/359, 428, 429, 449, 451, 459.1, 460, 473, DIG. 3

[56] References Cited

U.S. PATENT DOCUMENTS

| | | | |
|---|---|---|---|
| 5,123,945 | 6/1992 | Lin | 55/429 |
| 5,525,396 | 6/1996 | Rudolph et al. | 55/356 |
| 5,593,470 | 1/1997 | Shagott et al. | 55/356 |
| 5,785,723 | 7/1998 | Beran et al. | 55/356 |
| 5,853,441 | 12/1998 | Groen et al. | 55/356 |
| 6,027,541 | 2/2000 | Siemers | 55/429 |

*Primary Examiner*—David A. Simmons
*Assistant Examiner*—Minh-Chau T. Pham
*Attorney, Agent, or Firm*—Brinks Hofer Gilson & Lione

[57] ABSTRACT

A dust collecting container includes an annular lower portion and an annular upper portion having a first circumferential wall interposed between first annular upper and lower ends to define a first columnar chamber of a first length in a first axial direction, and a first annular flange which extends outwardly and radially from the first lower end. The lower portion has a second circumferential wall between second annular upper and lower ends to define a second columnar chamber of a second length in a second axial direction greater than the first length and of an inner diameter larger than an outer diameter of the first circumferential wall, and a second annular flange that extends radially and outwardly from the second annular upper end such that when the first annular lower end is brought towards the second annular upper end with the first axial direction aligned with the second axial direction, the first annular flange will superimpose on and abut against the second annular flange to form a fluid communication path between the first and second chambers. A bottom plate is sealingly and securely attached to the second lower end.

2 Claims, 3 Drawing Sheets

EASILY STORABLE DUST COLLECTING CONTAINER

FIELD OF THE INVENTION

The invention relates to a container, more particularly to an easily storable dust collecting container adapted to be used in a two-stage dust collecting device.

BACKGROUND OF THE INVENTION

Presently, a two-stage dust collecting device is available in the market which separates dust filtered from dust-laden air into coarse and fine dust portions and which collects the coarse and fine dust portions at different sites. A conventional two-stage dust collecting device includes a primary dust collecting container, a secondary dust collecting container disposed proximate to the primary dust collecting container, and a mounting cover disposed to cover sealingly an open upper end of the primary dust collecting container. The mounting cover has a mounting major wall with a peripheral portion, an inlet disposed in the mounting major wall for introducing the dust-laden air so as to collect the coarse dust portion in the primary dust collecting container, and an outlet disposed in the mounting major wall and spaced apart from the inlet and in communication with the secondary dust collecting container so as to draw out the fine dust portion from the primary dust collecting container. A blower is disposed downstream of the outlet to draw the fine dust portion for storage in the secondary dust collecting container. A filtering member is disposed upstream of the outlet to admit entrance of only the fine dust portion into the secondary dust collecting container via the outlet.

A drawback of the aforesaid dust collecting device resides in that the primary dust collecting container is bulky and is thus inconvenient to transport and store.

SUMMARY OF THE INVENTION

Therefore, the object of this invention is to provide a dust collecting container for use in a two-stage dust collecting device that facilitates storage and transport of the device.

Accordingly, a dust collecting container of this invention is used in a two-stage dust collecting device which separates dust filtered from dust-laden air into coarse and fine dust portions and which collects the coarse and fine dust portions at different sites. The two-stage dust collecting device includes a mounting cover having a mounting major wall with a peripheral portion, an inlet disposed in the major mounting wall for introducing dust-laden air, and an outlet disposed in the major mounting wall and spaced apart from the inlet for drawing the fine dust portion. A blower is disposed downstream of the outlet to draw out the fine dust portion. A filtering member is disposed upstream of the outlet to admit entrance of only the fine dust portion into the outlet. The dust collecting container includes an annular upper portion, an annular lower portion, a bottom plate, and a hoop member. The upper portion has a first annular upper end adapted to be engaged sealingly by the peripheral portion of the mounting cover, a first circumferential wall interposed between the first annular upper and lower ends to define a first columnar chamber of a first length in a first axial direction, and a first annular flange which extends outwardly and radially from the first annular lower end. The lower portion has a second annular upper end, a second annular lower end, a second circumferential wall interposed between the second annular upper and lower ends to define a second columnar chamber of a second length in a second axial direction that is greater than the first length and of an inner diameter larger than an outer diameter of the first circumferential wall of the upper portion, and a second annular flange that extends radially and outwardly from the second annular upper end such that when the first annular lower end is brought towards the second annular upper end with the first axial direction aligned with the second axial direction, the first annular flange will superimpose on and abut against the second annular flange, thereby forming a fluid communication path between the first and second columnar chambers. The bottom plate has a peripheral portion attached sealingly and securely to the second annular lower end. The hoop member has a bent strip with two spaced ends to be disposed around the first and second annular flanges, which abut against each other, the spaced ends being capable of being fastened together. The hoop member further has upper and lower strip sections integrally formed with and extending from the bent strip inwardly and radially relative to the first and second axial directions to receive the first and second annular flanges therein such that when the spaced ends are brought toward each other and are fastened together, the upper and lower strip sections will enclose and immobilize the first and second annular flanges relative to each other and subsequently form a leak-proof seal therebetween to prevent escape of fluid from the fluid communication path. When the spaced ends are unfastened, the upper and lower strip sections can be removed relative to the first and second annular flanges to result in separation between the upper and lower portions such that the upper portion can be turned upside down in order to insert the first circumferential wall into the second circumferential wall so as to store the upper portion in the lower portion with the first annular flange abutting against and resting on the second annular flange. Thus, an overall height of the dust collecting container of this invention is reduced. Preferably, the bottom plate is provided with a plurality of casters to facilitate movement thereof.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
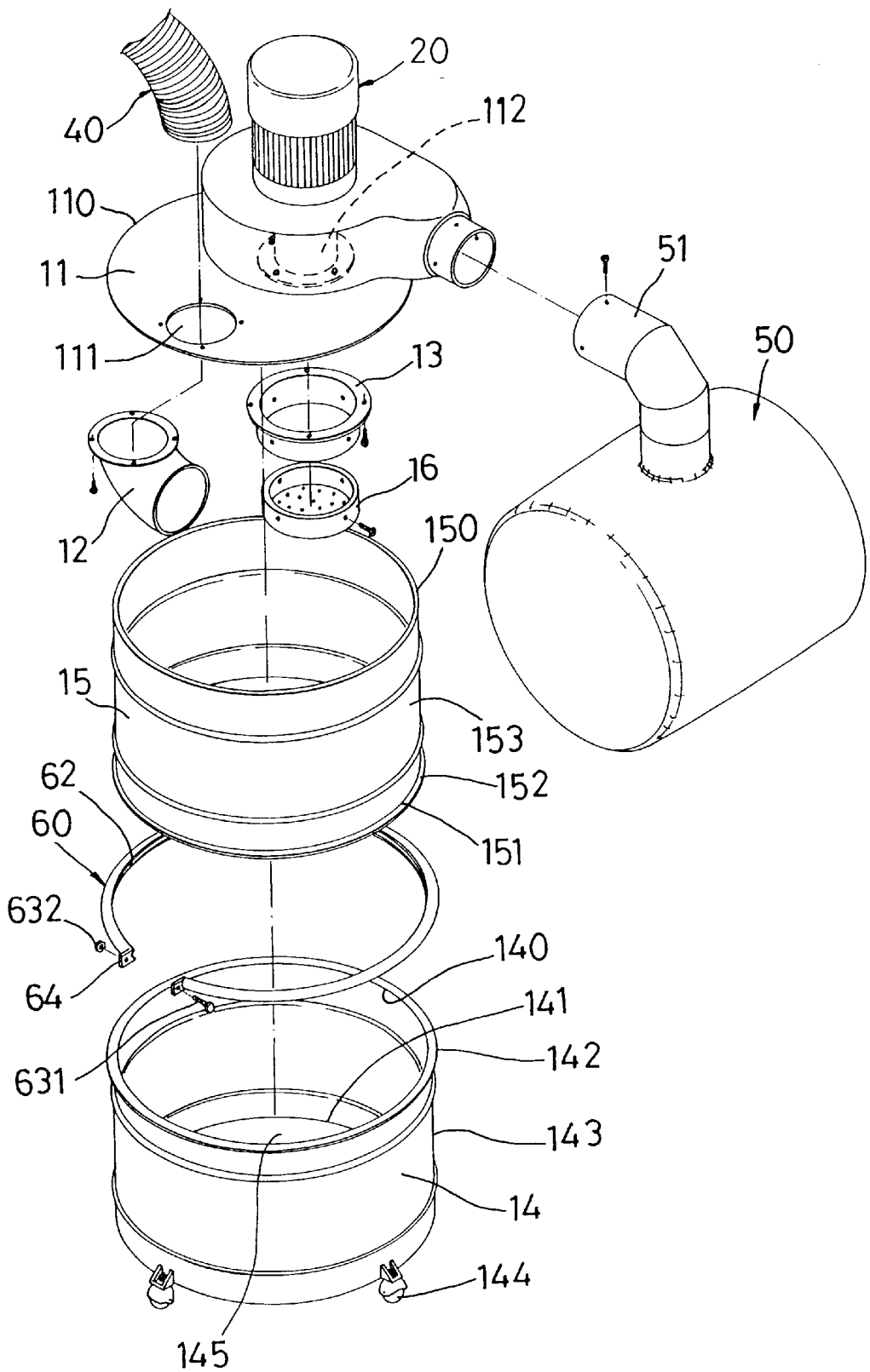
FIG. 1 is an exploded view of a preferred embodiment of an easily storable dust collecting container of this invention for use in a two-stage dust collecting device.
Figure 2:
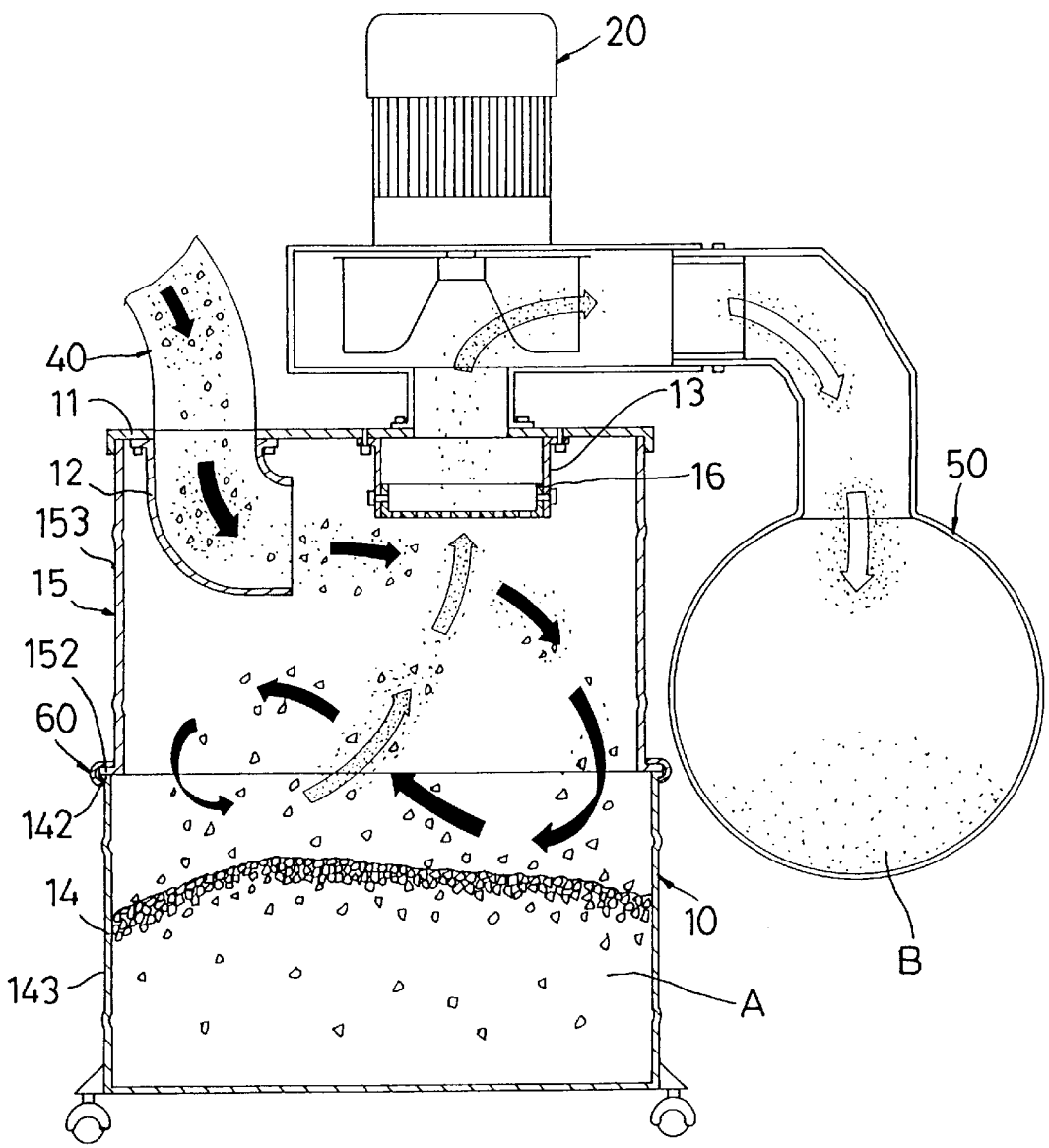
FIG. 2 is a schematic, partly sectional view of the preferred embodiment when employed in the two-stage dust collecting device.

Referring to FIGS. 1 and 2, the preferred embodiment of a dust collecting container according to this invention is shown to be adapted for use in a two-stage dust collecting device which separates dust filtered from dust-laden air into coarse and fine dust portions (A, B) and which collects the coarse and fine dust portions (A, B) at different sites. The two-stage dust collecting device includes a mounting cover 11 which has a mounting major wall with a peripheral portion 110, an inlet 111 disposed in the mounting major wall for introducting the dust-laden air via pipes 12, 14, an outlet 112 disposed in the mounting major wall and spaced apart from the inlet 111, a blower 20 disposed downstream of the outlet 112 for drawing out the fine dust portion, and a filtering member 16 disposed upstream of the outlet 112 to admit entrance of only the fine dust portion (B) into the outlet 112.

As illustrated, the dust collecting container 10 includes an annular upper portion 15, an annular lower portion 14, a bottom plate 145, and a hoop member 60. The upper portion 15 has a first annular upper end 150 adapted to be engaged sealingly by the peripheral portion 110 of the mounting cover 11, a first annular lower end 151, a first circumferential wall 153 interposed between the first upper and lower ends 150, 151 to define a first columnar chamber of a first length in a first axial direction, and a first annular flange 152 that extends outwardly and radially from the first annular lower end 151.

The lower portion 14 is separately formed relative to the upper portion 15, and has a second annular upper end 140, a second annular lower end 141, a second circumferential wall 143 interposed between the second annular upper and lower ends 140, 141 to define a second columnar chamber which has a second length in a second axial direction greater than the first length and an inner diameter larger than an outer diameter of the first circumferential wall 150 of the upper portion 15, and a second annular flange 142 that extends radially and outwardly from the second annular upper end 140. When the first annular lower end 151 is brought towards the second annular upper end 140 with the first axial direction aligned with the second axial direction, the first annular flange 152 will superimpose on and abut against the second annular flange 142,, thereby forming a fluid communication path between the first and second columnar chambers.

The bottom plate 145 has a peripheral portion attached sealingly and securely to the second annular lower end 141 of the lower portion 14.

The hoop member 60 has a bent strip with two spaced ends 64 to be disposed around the first and second annular flanges 152, 142, which abut against each other. The hoop member 60 further has upper and lower strip sections 62 which are integrally formed with the bent strip and which extend inwardly and radially therefrom relative to the first and second axial directions to receive the first and second annular flanges 152, 142 therein such that when the spaced ends 64 are brought toward each other and are fastened together by the use of a bolt-and-nut set (631, 632), the upper and lower strip sections 62 will enclose and immobilize the first and second flanges 152, 142 relative to each other and subsequently form a leak-proof seal between the first and second flanges 152, 142 to prevent escape of fluid from the fluid communication path.

Figure 3:
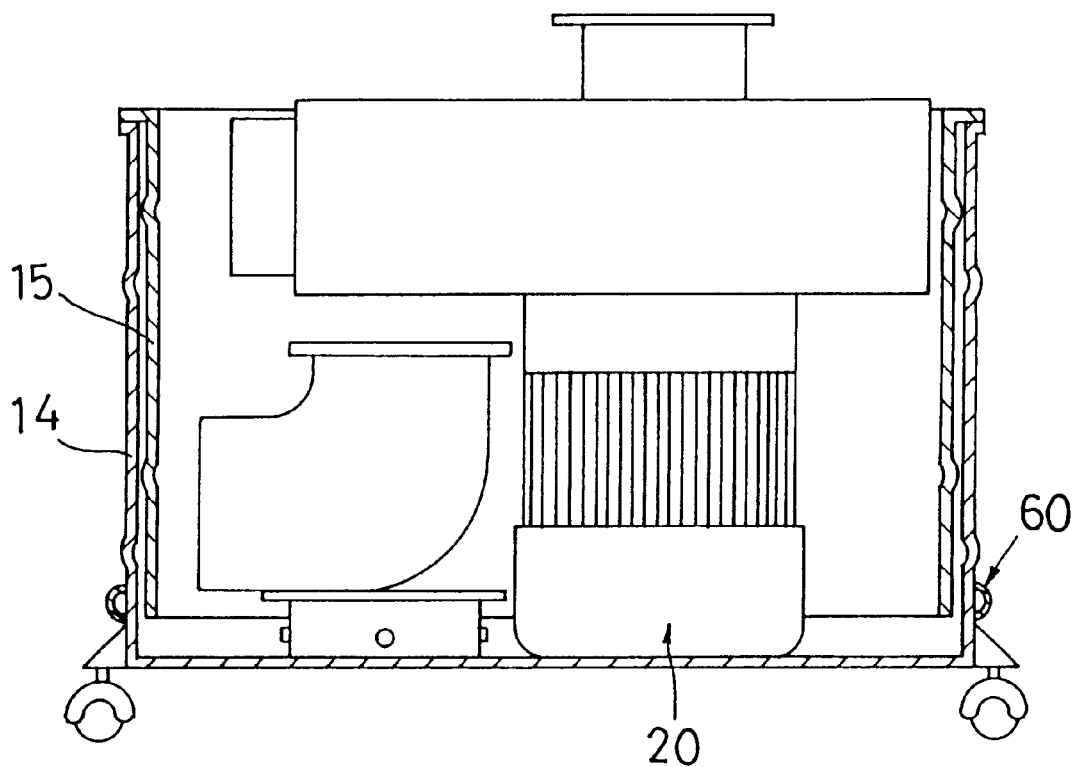
FIG. 3 illustrates the preferred embodiment in a detached condition to facilitate transport and storage.

Referring to FIG. 3, for storage and transport of the dust collecting container of this invention, the ends 64 are unfastened so as to remove the upper and lower strip sections 62 relative to the first and second annular flanges 152, 142 to result in separation between the upper and lower portions 15, 14 such that the upper portion 15 can be turned upside down in order to insert the first circumferential wall 153 into the second circumferential wall 143 so as to store the upper portion 15 in the lower portion 14 with the first annular flange 152 abutting against and resting on the second annular flange 142, thereby reducing an overall height of the dust collecting container.

In this preferred embodiment, the bottom plate 145 is preferably provided with a plurality of casters 144 to facilitate movement thereof. A fine dust collecting container 50 is connected to the outlet 112 via a connecting pipe 51. The filtering member 16 is mounted on a peripheral portion of the outlet 112 via a filter holding ring 13. As to how the blower 20 operates in order to draw the fine dust portion for storage in the fine dust collecting container 50, since this is known in the art and is not particularly relevant to this invention, a detailed description of the same is omitted herein for the sake of brevity. Of course, the coarse and fine dust collecting containers 10, 50 are provided with dust collecting bags for disposal purposes.

With this invention thus explained, it is apparent that numerous modifications and variations can be made without departing from the scope and spirit of this invention. It is therefore intended that this invention be limited only as indicated in the appended claims.

I claim:

1. An easily storable dust collecting container used for a two-stage dust collecting device which separates dust filtered from dust-laden air into coarse and fine dust portions and which collects the coarse and fine dust portions at different sites, the two-stage dust collecting device including:

a mounting cover having a mounting major wall with a peripheral portion;

an inlet disposed in the mounting major wall for introducing the dust-laden air;

an outlet disposed in the mounting major wall and spaced apart from the inlet for drawing out the fine dust portion;

a blower disposed downstream of the outlet to draw out the fine dust portion; and a filtering member disposed upstream of the outlet to admit entrance of only the fine dust portion into the outlet, the dust collecting container comprising:

an annular upper portion having a first annular upper end adapted to be engaged sealingly by the peripheral portion of the mounting cover, a first annular lower end, a first circumferential wall interposed between said first annular upper and lower ends to define a first columnar chamber of a first length in a first axial direction, and a first annular flange extending outwardly and radially from said first annular lower end;

an annular lower portion having a second annular upper end, a second annular lower end, a second circumferential wall interposed between said second annular upper and lower ends to define a second columnar chamber of a second length in a second axial direction, which is greater than said first length and of an inner diameter larger than an outer diameter of said first circumferential wall of said upper portion, and a second annular flange extending radially and outwardly from said second annular upper end such that when said first annular lower end is brought towards said second annular upper end with said first axial direction aligned with said second axial direction, said first annular flange will superimpose on and abut against said second annular flange, thereby forming a fluid communication path between said first and second columnar chambers;

a bottom plate having a peripheral portion attached sealingly and securely to said second annular lower end; and a hoop member having a bent strip with two spaced ends to be disposed around said first and second annular flanges which abut against each other, said spaced ends being capable of being fastened together, and upper and lower strip sections integrally with said bent strip and extending therefrom inwardly and radially relative to said first and second axial directions to receive said first and second annular flanges therein such that when said spaced ends are brought toward each other and fastened together, said upper and lower strip sections will enclose and immobilize said first and second flanges relative to each other and subsequently form a leak-proof seal therebetween to prevent escape of fluid from said fluid communication path, unfastening of said spaced ends permitting removal of said upper and lower strip sections relative to said first and second annular flanges to result in separation between said upper and lower portions such that said upper portion can be turned upside down in order to insert said first circumferential wall into said second circumferential wall so as to store said upper portion in said lower portion with said first annular flange abutting against and resting on said second annular flange, thereby reducing an overall height of the dust collecting container.

2. The easily storable dust collecting container as defined in claim 1, wherein said bottom plate is provided with a plurality of casters to facilitate movement thereof.

\* \* \* \* \*